US012162265B2

(12) United States Patent
Seemann et al.

(10) Patent No.: US 12,162,265 B2
(45) Date of Patent: Dec. 10, 2024

(54) OFFSET PRINT APPARATUS AND METHODS

(71) Applicant: Hewlett-Packard Development Company, L.P., Spring, TX (US)

(72) Inventors: Ziv Seemann, Ness Ziona (IL); Boris Unaeve, Ness Ziona (IL); Avi Barazani, Ness Ziona (IL); Israel Katz, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 351 days.

(21) Appl. No.: 17/255,740

(22) PCT Filed: Feb. 22, 2019

(86) PCT No.: PCT/US2019/019226

§ 371 (c)(1),
(2) Date: Dec. 23, 2020

(87) PCT Pub. No.: WO2020/171826

PCT Pub. Date: Aug. 27, 2020

(65) Prior Publication Data

US 2021/0370665 A1 Dec. 2, 2021

(51) Int. Cl.
*B41F 31/16* (2006.01)
*B41F 16/00* (2006.01)
(Continued)

(52) U.S. Cl.
CPC .............. *B41F 31/16* (2013.01); *B41F 16/00* (2013.01); *B41F 17/007* (2013.01); *B41J 2/01* (2013.01);
(Continued)

(58) Field of Classification Search
None
See application file for complete search history.

(56) References Cited

U.S. PATENT DOCUMENTS 3,326,435 A 6/1967 Shelton
5,558,263 A 9/1996 Long
(Continued)

FOREIGN PATENT DOCUMENTS

CA 1133756 10/1982
CN 1118306 A 3/1996
(Continued)

OTHER PUBLICATIONS

All-Air Web Guiding Systems, A Simpler Way to Guide, May 2, 2013, Coast Controls, 24 pgs, http://www.coastcontrols.com/clientuploads/docs/CoastControlsBrochurev13.pdf.
(Continued)

*Primary Examiner* — Joshua D Zimmerman
(74) *Attorney, Agent, or Firm* — Jordan IP Law, LLC

(57) ABSTRACT

Offset print apparatus comprises a blanket arranged in a closed loop around a plurality of rollers. Each of the plurality of rollers is rotatable about a respective roller axis to support and convey the blanket around the closed loop. The plurality of rollers comprises: a primary steering roller rotatable about a primary roller axis and being pivotable about a primary steering axis perpendicular to the primary roller axis; and a secondary steering roller rotatable about a secondary roller axis and being pivotable about a secondary steering axis perpendicular to the secondary roller axis. The primary and secondary steering rollers are each independently pivotable. The offset print apparatus further comprises an actuator to actuate pivoting of the primary steering roller and the secondary steering roller.

14 Claims, 2 Drawing Sheets

(51) Int. Cl.
*B41F 17/00* (2006.01)
*B41J 2/01* (2006.01)
*G03G 15/16* (2006.01)

(52) U.S. Cl.
CPC ..... *G03G 15/1615* (2013.01); *B41J 2002/012* (2013.01)

(56) References Cited

U.S. PATENT DOCUMENTS

| | | | |
|---|---|---|---|
| 2004/0177779 | A1 | 9/2004 | Steffen et al. |
| 2006/0291913 | A1 | 12/2006 | Hiroe et al. |
| 2012/0148299 | A1 | 6/2012 | Yamamoto et al. |
| 2012/0328337 | A1 | 12/2012 | Hiratsuka et al. |
| 2013/0129394 | A1 | 5/2013 | Shirakata et al. |
| 2014/0319194 | A1 | 10/2014 | Swanson et al. |
| 2014/0369721 | A1 | 12/2014 | Miyazawa et al. |
| 2015/0078785 | A1 | 3/2015 | Tanner et al. |

FOREIGN PATENT DOCUMENTS

| | | | |
|---|---|---|---|
| CN | 1872644 | A | 12/2006 |
| CN | 102998927 | A | 3/2013 |
| CN | 103123449 | A | 5/2013 |
| CN | 104460262 | A | 3/2015 |
| CN | 104553421 | A | 4/2015 |
| JP | 2007-254155 | A | 10/2007 |

OTHER PUBLICATIONS

Shelton, John Jarvis, Lateral dynamics of a moving web, PhD diss., Oklahoma State University, 1968, 191 pgs.

OFFSET PRINT APPARATUS AND METHODS

BACKGROUND

Print apparatus may be used to print representations, such as text or images, onto print substrates. Print apparatus may print representations by offset printing methods. Offset printing may involve forming representations in a printing agent on an intermediate printing surface and then transferring the printing agent from the intermediate printing surface to a print substrate. The intermediate printing surface may be a blanket such as a rubber blanket. The printing agent may be an ink.

FIGURES

Various examples will be described below with reference to the following figures, wherein.

DESCRIPTION

Figure 1:
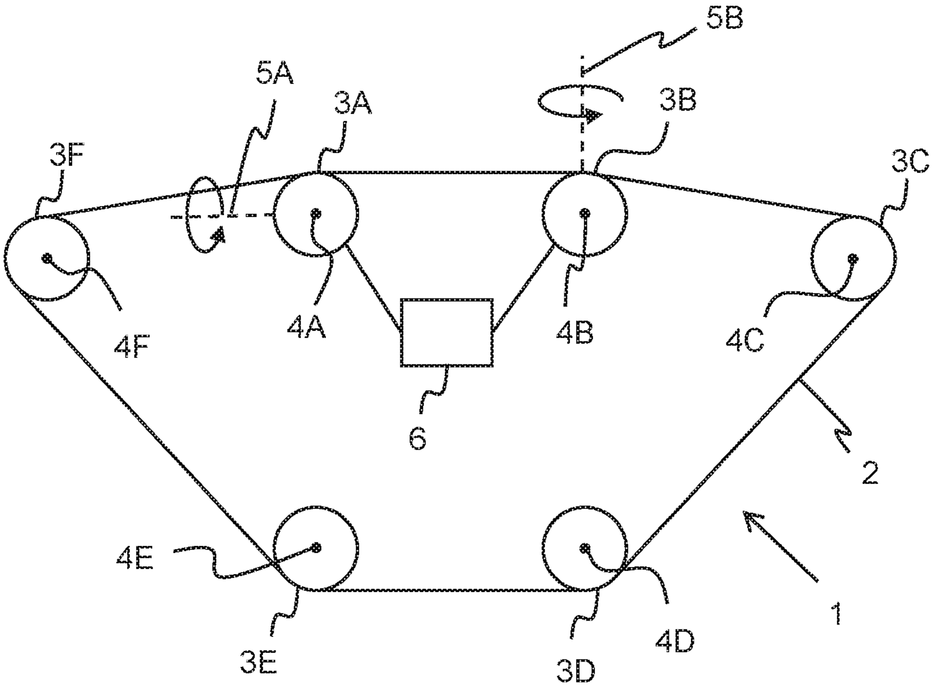
FIG. 1 is a schematic cross-sectional illustration of an offset print apparatus.

FIG. 1 is a schematic illustration of an example offset print apparatus 1. The offset print apparatus 1 comprises a blanket 2 arranged in a closed loop around a plurality of rollers 3A-3F. Each of the plurality of rollers is rotatable about a respective roller axis 4A-4F to support and convey the blanket around the closed loop. In particular, the plurality of rollers 3A-3F includes a primary steering roller 3A rotatable about a primary roller axis 4A and a secondary steering roller 3B rotatable about a secondary roller axis 4B. The primary steering roller 3A is pivotable about a primary steering axis 5A perpendicular to the primary roller axis 4A. The secondary steering roller 3B is pivotable about a secondary steering axis 5B perpendicular to the secondary roller axis 4B. Each of the primary and secondary steering rollers 3A and 3B are independently pivotable. The offset print apparatus also comprises an actuator 6 to actuate pivoting of the primary steering roller 3A and the secondary steering roller 3B. In some examples, there may be separate actuators for each respective roller.

An offset print apparatus of the type shown in FIG. 1 is suitable for use in offset printing of representations onto a print substrate. Rotation of one or more of the plurality of rollers about a respective roller axis may drive movement of the blanket 2 around the closed loop. Printing agent may be applied to the blanket 2 as it is conveyed around the closed loop. Printing agent may subsequently be transferred from the blanket 2 to a print substrate, for example at a location around the closed loop which is spaced apart from the location at which printing agent is applied to the blanket. In some examples, the printing agent is an ink. In some examples, the offset print apparatus is an analogue offset print apparatus and the printing agent (e.g. ink) is applied to the blanket by an inked plate or roller. In some examples, the offset print apparatus is a digital offset print apparatus and the printing agent (e.g. ink) is applied to the blanket using digital printing techniques such inkjet printing or liquid electrophotographic printing (LEP) techniques. In some examples, the blanket is made of a resilient material such as rubber.

Pivoting of the primary steering roller 3A and/or the secondary steering roller 3B may be done to steer the blanket 2 around the closed loop. Steering the blanket 2 around the closed loop may comprise adjusting a lateral position of the blanket on the rollers 3A-3F and/or adjusting a skew of the blanket 2 on the rollers 3A-3F. Steering the blanket 2 so as to adjust the lateral position of the blanket 2 on the rollers 3A-3F may be performed to correct for a lateral offset of the blanket 2 on the rollers 3A-3F, for example relative to a predetermined baseline lateral position of the blanket 2 at a predetermined location around the loop. Steering the blanket 2 so as to adjust the skew of the blanket on the rollers 3A-3F may be performed to correct skew of the blanket 2 on the rollers 3A-3F, for example relative to a predetermined baseline orientation of the blanket 2 (e.g. an orientation of the blanket which defines a baseline direction of an edge or centreline of the blanket 2, or a baseline plane or line corresponding to zero skew of the blanket). Skew may be referred to as rotational offset of the blanket, which is unrelated to rotation of any roller. Lateral and/or rotational offset of the blanket 2 on the rollers 3A-3F can lead to a reduction in print quality due to inaccurate or incomplete application of printing agent onto the blanket 2, or inaccurate or incomplete transfer of printing agent from the blanket 2 onto the print substrate. Correction of lateral and/or rotational offset (skew) may therefore improve print quality. Because the primary and secondary steering rollers 3A and 3B are independently pivotable, greater flexibility in steering control may be possible.

In general, the primary steering axis 5A may be parallel to, perpendicular to; or inclined with respect to a plane tangent to a wrapped portion of the primary steering roller 5A which is wrapped by (i.e. in contact with) the blanket 2; and the secondary steering axis 5B may be parallel to, perpendicular to, or inclined with respect to a plane tangent to a wrapped portion of the secondary steering roller 5B which is wrapped by (i.e. in contact with) the blanket 2. In the example shown in FIG. 1, the primary steering axis 5A is generally parallel to a plane tangent to the portion of the primary steering roller 5A wrapped by the blanket 2 (e.g. the plane tangent to a line bisecting the wrapped portion and parallel with the roller axis 4A), and the secondary steering axis 5B is generally perpendicular to a plane tangent to the portion of the secondary steering roller 3B wrapped by the blanket 2 (e.g. the plane tangent to a line bisecting the wrapped portion and parallel with the roller axis 4B).

In other examples, each of the primary steering axis 5A and the secondary steering axis 5B may be generally parallel to the respective plane tangent to the portion of the corresponding steering roller 3A,3B wrapped by the blanket 2. In further examples, each of the primary steering axis 5A and the secondary steering axis 5B may be generally perpendicular to the respective plane tangent to the portion of the corresponding steering roller 3A,3B wrapped by the blanket 2. In yet further examples, one or both of the primary steering axis 5A and the secondary steering axis 5B may be inclined at an angle between 0° and 90° with respect to the respective plane tangent to the portion of the corresponding steering roller 3A,3B wrapped by the blanket 2. In some examples, such as illustrated in FIG. 1, the primary steering axis and the secondary steering axis are substantially perpendicular to one another.

Figure 2:
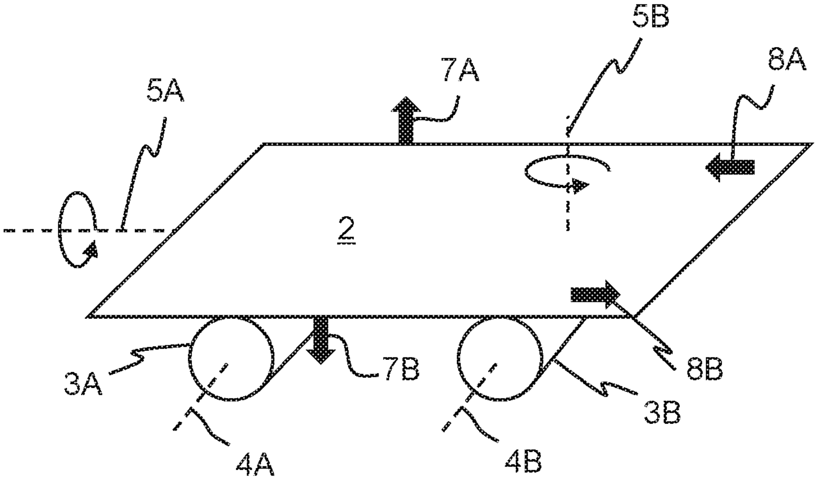
FIG. 2 is a schematic perspective view of a portion of the offset print apparatus of FIG. 1.

FIG. 2 is a schematic perspective view of a portion of the offset print apparatus 1 including primary and secondary steering rollers 3A and 3B. As can be seen more clearly in FIG. 1, the blanket wraps around a respective portion of each roller 3A and 3B such that the wrap angle at each roller 3A and 3B is small (for example, less than about 20°); but non-zero. Each wrap angle in FIG. 2 is the same as the corresponding wrap angle in FIG. 1, although it is not necessarily visible in FIG. 2 due to its schematic nature. As illustrated in FIG. 2, in an example in which the primary steering axis 5A is generally parallel to the plane tangent to the portion of the primary steering roller 3A wrapped by the blanket 2, pivoting of the primary steering roller 3A about the primary steering axis 5A introduces twist to the blanket 2. Twist in the blanket 2 is illustrated in FIG. 2 by arrows 7A and 78 which indicate that twisting of the blanket 2 comprises primarily movement of opposing edges of the blanket 2 in opposing directions perpendicular to the plane tangent to the portion of the primary steering roller 3A wrapped by the blanket 2. As further illustrated schematically in FIG. 2, in an example in which the secondary steering axis 5B is generally perpendicular to the plane tangent to the portion of the primary steering roller 3B wrapped by the blanket 2, pivoting of the secondary steering roller 3B about the secondary steering axis 5B stretches the blanket 2. Stretch of the blanket 2 is illustrated in FIG. 2 by arrows 8A and 8B which indicate that stretching of the blanket 2 comprises primarily movement of opposing edges of the blanket 2 in opposing directions which lie in the plane tangent to the portion of the secondary steering roller 3B wrapped by the blanket 2 and which are generally perpendicular to the secondary roller axis 4B.

It will be appreciated that twisting of the blanket may also cause stretching of the blanket. Similarly, stretching of the blanket may also cause twisting of the blanket. However, when a steering roller is pivoted about a steering axis which is generally parallel to a plane tangent to the portion of the steering roller wrapped by the blanket, steering occurs predominantly by twisting; and when a steering roller is pivoted about a steering axis which is generally perpendicular to any plane tangent to the portion of the steering roller wrapped by the blanket, steering occurs predominantly by stretching.

More generally, when a steering roller is pivoted about a steering axis which is parallel to or inclined by no more than about 45° relative to a plane tangent to the portion of the steering roller wrapped by the blanket, twist is introduced to the blanket and steering occurs predominantly by twisting; and when a steering roller is pivoted about a steering axis which is perpendicular to or inclined by more than 45° relative to any plane tangent to the portion of the steering roller wrapped by the blanket, stretch is introduced to the blanket and steering occurs predominantly by stretching. Accordingly, in some examples, the primary steering axis is inclined by no more than 45° relative to the plane tangent to the portion of the primary steering roller wrapped by the blanket (e.g. the plane intersecting a line bisecting the wrapped portion of the roller) such that pivoting the primary steering roller introduces twist to the blanket and the secondary steering axis is perpendicular or inclined by more than 45° relative to any plane tangent to the portion of the secondary steering roller wrapped by the blanket.

Twisting of the blanket 2 may be a more effective method of correcting lateral and/or rotational offset of the blanket 2 on the roller 3A-3F than stretching of the blanket 2. For example, it may be possible to correct for larger lateral and/or rotational offsets by twisting the blanket compared to stretching the blanket. Twisting the blanket may also enable faster correction of lateral and/or rotational offsets than stretching the blanket. However, twisting of the blanket 2 may interfere with printing processes. For example, excessive twisting of the blanket 2 may result in inaccurate or incomplete application of printing agent onto the blanket 2, leading to a reduction in print quality. Excessive twisting may create an excessive variation in tension across the blanket. In examples in which a first steering roller steers the blanket predominantly by twisting and a second steering roller steers the blanket predominantly by stretching, both steering methods can be combined in order to provide accurate steering of the blanket with less of a reduction in print quality. For example, steering the blanket by twisting the blanket may be used to correct for larger lateral and/or rotational offsets of the blanket which may occur transiently (such as during start-up of the offset print apparatus), during which time printing processes (such as application of printing agent to the blanket) may be suspended, whereas steering the blanket by stretching the blanket may be used to correct for ongoing (e.g. steady-state) or smaller lateral and/or rotational offsets of the blanket. In some examples, printing processes may be carried out while steering the blanket by stretching the blanket.

It will be appreciated that different arrangements of primary and secondary steering rollers are possible. In some examples, the offset print apparatus includes a plurality of primary steering rollers, each primary steering roller being rotatable about a respective primary roller axis and being pivotable about a respective primary steering axis perpendicular to the corresponding primary roller axis. In some examples, the offset print apparatus includes a plurality of secondary steering rollers, each secondary steering roller being rotatable about a respective secondary roller axis and being pivotable about a respective secondary steering axis perpendicular to the corresponding secondary roller axis. For example, the offset print apparatus may comprise one primary steering roller and two secondary steering rollers.

In some examples, the or each primary and/or secondary steering axes intersect the corresponding primary and/or secondary roller axes of the respective primary and/or secondary steering rollers. In other examples, one, some or all of the primary and/or secondary steering axes are offset from the corresponding primary and/or secondary roller axes of the respective primary and/or secondary steering rollers such that the offset primary and/or secondary steering axes and primary and/or secondary roller axes do not intersect.

In some examples, the primary and secondary steering rollers are generally cylindrical. The or each primary and/or secondary steering rollers may have the same or different diameters. In some examples, the diameter of the or each primary steering roller is greater than the diameter of the or each secondary steering roller. In some examples, it may be that the diameter of the or each primary steering roller is greater than the diameter of the or each secondary steering roller, that the or each primary steering roller steers the blanket predominantly by twisting, and that the or each secondary steering roller steers the blanket predominantly by stretching.

In some examples, a size of the portion of the or each primary steering roller wrapped by the blanket is greater than a size of the portion of the or each secondary steering roller wrapped by the blanket. In some examples, an area of the portion of the or each primary steering roller wrapped by the blanket is greater than an area of the portion of the or each secondary steering roller wrapped by the blanket. In some examples, a width of the portion of the or each primary steering roller wrapped by the blanket is greater than a width of the portion of the or each secondary steering roller wrapped by the blanket, wherein the width of a portion of a steering roller is measured in the direction of travel of the blanket around the closed loop. In some examples, a ratio of the width of the portion of the or each primary steering roller wrapped by the blanket to a distance between the respective primary steering roller and the corresponding immediately preceding roller (relative to the direction of travel of the blanket around the closed loop) is larger than a ratio of the width of the portion of the or each secondary steering roller wrapped by the blanket to a distance between the respective secondary steering roller and the corresponding immediately preceding roller (relative to the direction of travel of the blanket around the closed loop), The distance between a steering roller and the immediately preceding roller (relative to the direction of travel of the blanket around the closed loop) may be referred to as the entering span for the steering roller.

In some examples, the wrap angle of the blanket around the or each primary steering roller is greater than the wrap angle of the blanket around the or each secondary steering roller. For example, the wrap angle of the blanket around the or each primary steering roller may be at least twice the wrap angle of the blanket around the or each secondary steering roller. In some examples, it may be that the wrap angle of the blanket around the or each primary steering roller is greater than the wrap angle of the blanket around the or each secondary steering roller, that the or each primary steering roller steers the blanket predominantly by twisting, and that the or each secondary steering roller steers the blanket predominantly by stretching. In some examples, the wrap angle of the blanket around the or each primary steering roller is greater than about 45°, for example greater than about 90°, and the wrap angle of the blanket around the or each secondary steering roller is less than about 45°. It may be that, in such examples, pivoting movement of the or each primary steering roller (i.e. by unit pivoting) causes the blanket to twist between adjacent rollers of the plurality of rollers to a greater degree than pivoting movement of the or each secondary steering roller (i.e. by unit pivoting).

In some examples, the offset print apparatus comprises a controller to independently actuate the or each primary and secondary steering rollers to pivot about their respective steering axes to steer the blanket. In some examples, the offset print apparatus further comprises a sensor to determine a lateral position and/or skew of the blanket, and the controller is to independently actuate the or each primary and secondary steering rollers to pivot about their respective steering axes based on an output from the sensor.

Figure 3:
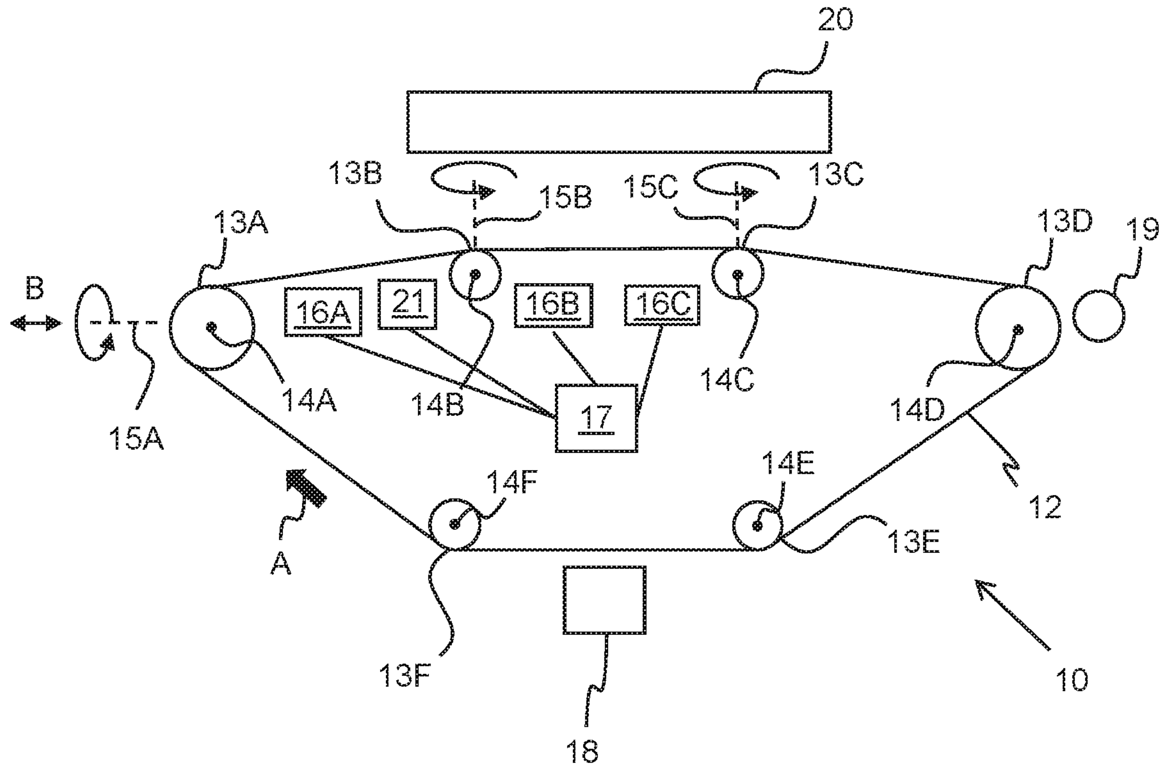
FIG. 3 is a schematic cross-sectional illustration of an offset print apparatus.

FIG. 3 is a schematic illustration of an example offset print apparatus 10. The offset print apparatus 10 comprises a blanket 12 arranged in a closed loop around a plurality of rollers 13A-13F. Each of the plurality of rollers is rotatable about a respective roller axis 14A-14F to support and convey the blanket around the closed loop. In particular, the plurality of rollers 13A-13F includes a primary steering roller 13A rotatable about a primary roller axis 14A and two secondary steering rollers 13B and 13C, each rotatable about corresponding secondary roller axes 14B and 14C. The primary steering roller 13A is pivotable about a primary steering axis 15A perpendicular to the primary roller axis 14A. Each secondary steering roller 13B,13C is pivotable about a corresponding secondary steering axis 15B,15C perpendicular to the corresponding secondary roller axis 14B,14C. Each of the primary and secondary steering rollers 13A, 13B and 13C are independently pivotable.

In the example shown in FIG. 3, the diameter of the primary steering roller 13A is greater than the diameter of both the secondary steering rollers 13B and 13C. In addition, the wrap angle of the blanket 12 around the primary steering roller 13A is greater than the wrap angle of the blanket 12 around either secondary steering roller 13B or 13C. In this particular example, the wrap angle of the blank 12 around the primary steering roller 13A is greater because the primary steering roller 13A is disposed at a principal vertex of a cross-section of the loop defined by the blanket 2 at which the internal angle between adjacent portions of the loop is relatively small, for example less than 90°, such as 45°. In contrast, in this example each of the secondary rollers 13B, 13C are disposed midway along a substantially elongate portion of the loop, wherein any change in direction of the loop is relatively small such that the internal angle between adjacent portions of the loop is relatively high such as at least 135°, such as nearly 180°.

The offset print apparatus 10 also comprises actuators 16A, 16B and 16C to independently actuate pivoting of the primary steering roller 13A and the secondary steering rollers 13B and 13C respectively. The offset print apparatus 10 includes a controller 17 operatively connected to the actuators 16A,16B,16C to control operation of the actuators 16A, 16B, 16C. The controller 17 is to independently actuate the primary steering roller 13A and the secondary steering rollers 13B and 13C to pivot about their respective steering axes to steer the blanket 12. In some examples, the secondary steering rollers 13B and 13C are pivotable independently of one another and the controller 17 is to independently actuate the secondary steering rollers 13B and 13C to pivot about their respective steering axes. In other examples, the secondary steering rollers 13B and 13C are coupled to one another such that pivoting of the secondary steering rollers 13B and 13C is coupled. In such examples, the controller is to actuate the secondary steering rollers 13B and 13C to pivot in unison about their respective steering axes. It has been found that correction of larger lateral offsets is possible using coupled secondary steering rollers than independently pivotable secondary steering rollers.

The primary steering roller 12 A is also translatable along a tensioning axis (indicated by arrow B) normal to the primary roller axis 14A to vary a tension (e.g. in a plane normal to the roller axis 14A) in the blanket 12 by movement to increase the length of the loop circumscribing the rollers. The offset print apparatus 10 further comprises a tensioning actuator (not shown) to drive translation of the primary steering roller along the tensioning axis. The tensioning axis and the primary steering axis 15 are collinear. However, in some examples, the tensioning axis and the primary steering axis may be inclined relative to one another. The controller 17 is to control the tensioning actuator to actuate translation of the primary steering roller 13A along the tensioning axis 15.

The offset print apparatus 10 includes printing agent applicator 18 to apply printing agent to the blanket 12. As shown in FIG. 3, the printing agent applicator 18 may be located at a portion of the loop opposing a portion of the loop where the secondary steering rollers 13B, 13C are located. In some examples, the printing agent applicator is a digital printing device. In some examples, the printing agent applicator includes one or more inkjet printheads. In some examples, the printing agent applicator includes one or more liquid electrophotographic (LEP) ink developers. The plurality of rollers 13A-13F includes support rollers 13E and 13F located opposite the printing agent applicator 18. The plurality of rollers 13A-13F also includes transfer roller 13D to transfer printing agent from the blanket 12 to a print substrate (not shown) fed between the transfer roller 13D and an opposing impression roller 19. A dryer 20 is arranged adjacent the blanket 12, opposite the secondary steering rollers 13B and 13C, to direct air towards the blanket 12 to dry printing agent on the blanket 12. In order to effectively dry the print agent on the blanket, the dryer 20 should be located close to the blanket 12.

The offset print apparatus 10 also includes an edge sensor 21 operable to determine a location of a lateral edge of the blanket 12 as it travels around the closed loop. The edge sensor 21 is operatively connected to the controller 17 such that the controller 17 receives an output from the edge sensor 21 indicative of the lateral position of the edge of the blanket 12. The controller is to control operation of the actuators 16A,16B,16C based on the output from the edge sensor 21. In other examples, the edge sensor 21 is replaced by any type of sensor known in the field for determining the lateral position of the blanket, in some examples, the offset print apparatus 10 includes a camera for capturing an image of an edge of the blanket and the controller is to determine the lateral position of the blanket based on the image captured by the camera, for example by processing the image using an edge detection algorithm.

The offset print apparatus of the type shown in FIG. 3 is suitable for use in offset printing of representations onto a print substrate. Rotation of one or more of the plurality of rollers 13A-13F about a respective roller axis drives movement of the blanket 12 around the closed loop in the direction indicated by arrow A. Printing agent, such as ink, may be applied to the blanket 12 by the printing agent applicator 18 as the blanket 12 is conveyed around the closed loop. Printing agent on the blanket 12 may be dried by air directed by the dryer 20 towards the blanket 12 as the blanket 12 passes by the dyer 20. Printing agent may subsequently be transferred from the blanket 12 to a print substrate (not shown) as the blanket 12 passes between the transfer roller 13D and the impression roller 19.

Pivoting of the primary steering roller 13A and/or the secondary steering rollers 13B,13C may be used to steer the blanket 12 around the closed loop. Steering the blanket 12 around the closed loop may comprise adjusting a lateral position of the blanket 12 on the rollers 13A-13F and/or adjusting a skew of the blanket 12 on the rollers 13A-13F. Steering the blanket 12 so as to adjust the lateral position of the blanket 12 on the rollers 13A-13F may be performed to correct for a lateral offset of the blanket 2 on the rollers 13A-13F. Steering the blanket 12 so as to adjust the skew of the blanket on the rollers 13A-13F may be performed to correct skew (i.e. a rotational offset) of the blanket 12 on the rollers 13A-13F. Lateral and/or rotational offset of the blanket 12 on the rollers 13A-13F can lead to a reduction in print quality due to inaccurate or incomplete application of printing agent onto the blanket 12 by the printing agent applicator 18, or inaccurate or incomplete transfer of printing agent from the blanket 12 onto the print substrate at the transfer roller 13D. Correction of lateral and/or rotational offsets may therefore improve print quality. Because the primary and secondary steering rollers 13A, 13B and 13C are independently pivotable, greater flexibility in steering control may be possible.

In the example shown in FIG. 3, the primary steering axis 15A is generally parallel to a plane tangent to the portion of the primary steering roller 15A wrapped by the blanket 12 (e.g. the plane tangent to the roller when it departs the roller towards the secondary rollers 13B, 13C), and the secondary steering axes 15B and 15C are each generally perpendicular to any planes tangent to the respective portions of the corresponding secondary steering rollers 13B and 13C wrapped by the blanket 12. Accordingly, pivoting of the primary steering roller 13A about the primary steering axis 15A introduces twist to the blanket 12, whereas pivoting one or both of the secondary steering rollers 13B,13C about respective secondary steering axes 15B,15C stretches the blanket 12.

In use, the controller 17 receives an output from the edge sensor 21 indicative of a lateral position of the blanket 12. The controller 17 determines an offset in lateral position and/or orientation of the blanket 12 based on the output from the edge sensor 21. For example, the controller 17 may determine a difference in the lateral position and/or orientation of the blanket 12 from a predetermined baseline lateral position and/or orientation of the blanket 12. The controller 17 selectively controls operation of the actuators 16A,16B,16C to actuate the primary steering roller 13A and/or one or both of the secondary steering rollers 13B,13C to steer the blanket 12 to correct for the offset in lateral position and/or orientation of the blanket 12, for example to reduce the magnitude of the difference.

It has been found that twisting of the blanket 12 by pivoting the primary steering roller 13A about the primary steering axis 15A is a more effective method of correcting lateral and/or rotational offset of the blanket 12 on the rollers 13A-13F than stretching of the blanket 12 by pivoting one or both of the secondary steering rollers 13B,13C about respective secondary steering axes 15B,15C. In particular, it is possible to correct for larger offsets in lateral position and/or skew of the blanket 12 by steering the blanket using the primary steering roller 13A, whereas it is possible to achieve finer control of smaller offsets in lateral position and/or skew of the blanket 12 by steering the blanket using the secondary steering rollers 13B,13C. It is also possible to correct lateral and/or rotational offsets more quickly by pivoting the primary steering roller 13A than by pivoting the secondary steering rollers 13B,13C.

In addition, when attempting to steer the blanket 12 through large angles (for example, to correct for large lateral offsets), it is more likely for the blanket 12 to slip on the rollers when steered by the secondary steering rollers 13B, 13C than when steered by the primary steering roller 13A. One reason for increased blanket slip when steering using the secondary steering rollers 13B,13C is the reduced wrap angle of the blanket 12 around the secondary steering rollers 13B,13C compared to the primary steering roller 13A. Wrap angle cannot be increased through use of snub rollers in contact with the opposing surface of the blanket 12 as this would interfere with the printing process and reduce print quality.

It has also been found that excessive twisting of the blanket 12 may interfere with the printing process. For example, excessive twisting of the blanket 12 (e.g. at any location around the loop) may result in inaccurate or incomplete application of printing agent onto the blanket 12 at the printing agent applicator 18, leading to a reduction in print quality. In addition, excessive pivoting of the primary steering roller 13A can interfere with the operation of the dyer 20.

Accordingly, the controller 17 may selectively operate the primary and secondary steering rollers 13A,13B,13C dependent on the magnitude of the difference in the position and/or orientation of the blanket 12 from the predetermined baseline position and/or orientation of the blanket. For example, the controller 17 may be to select one of the primary steering roller 13A and one or both of the secondary steering rollers 13B,13C to actuate for a steering operation based on a magnitude of a difference between a lateral position and/or skew of the blanket 12 and a predetermined baseline lateral position and/or skew (e.g. a lateral displacement of the blanket) corresponding to the steering operation. The controller may be to select the primary steering roller 13A for a steering operation when the magnitude of the difference exceeds a threshold. The controller may be to select the or each secondary steering roller 13B,13C for a steering operation when the magnitude of the difference is below the threshold. It may be that the primary steering roller 13A does not pivot during the steering operation in which the or each secondary steering roller 13B,13C is selected. Similarly, it may be that neither secondary steering roller 13B,13C pivots during the steering operation in which the primary steering roller 13A pivots.

Figure 4:
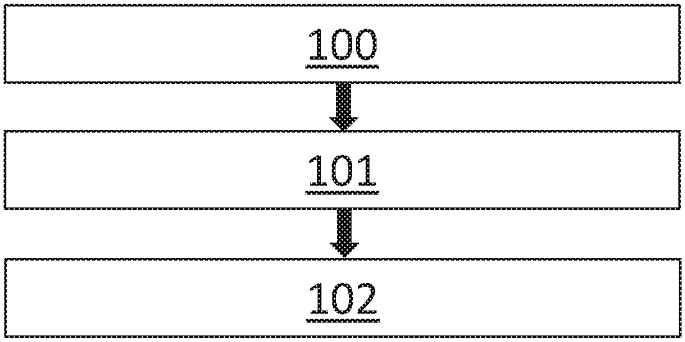
FIG. 4 is a flow diagram illustrating a method of operating an offset print apparatus.

Accordingly, in some examples, a method of operating the offset print apparatus (as illustrated schematically in FIG. 4) may therefore include: determining the difference between the lateral position and/or skew of the blanket and the predetermined baseline position and/or skew (block 100 in FIG. 4); when the magnitude of the difference exceeds a threshold, causing the primary steering roller 13A to pivot about the primary steering axis 15A to adjust the position and/or skew of the blanket to bring the magnitude below the threshold (block 101 in FIG. 4); and subsequently, when the magnitude of the difference is below the threshold, causing one or both secondary steering rollers 13B,13C to pivot about the respective secondary steering axes 15B,15C to adjust the position and/or skew of the blanket while the primary roller axis 14A of the primary steering roller 13A remains static, that is to say, while the primary steering roller 13A does not pivot about the primary steering axis 15A (block 102 in FIG. 4).

The printing process (such as application of printing agent to the blanket by the printing agent applicator 18, operation of the dryer 20, and/or transfer of printing agent from the blanket to the print substrate) may be suspended while the primary steering roller 13A is pivoted to steer the blanket such that excessive twisting of the blanket does not interfere with the printing process. In some examples, the printing process proceeds while one or both secondary steering rollers 13B,13C are pivoted to steer the blanket and the primary roller axis 14A is static (i.e. the primary steering roller 13A does not pivot about the primary steering axis 15A). In some examples, the primary roller axis 14A is held substantially horizontal as the printing process proceeds Accordingly, in some examples, the controller is to control the printing agent applicator 18 so that the printing agent applicator 18 is disengaged for steering operations when the magnitude of the difference exceeds a threshold, and are engaged for steering operations when the magnitude of the difference is below the threshold. In other examples, the printing process may be suspended while the primary or secondary steering rollers 13A,13B,13C are pivoted to steer the blanket and the printing process may resume when all of the primary and secondary roller axes 14A,14B,14C are static.

In some examples, the method of operating the offset print apparatus includes: determining the difference between the lateral position and/or skew of the blanket and the predetermined baseline position and/or skew; when the magnitude of the difference exceeds a threshold, causing the primary steering roller 13A to pivot about the primary steering axis 15A to adjust the position and/or skew of the blanket to bring the magnitude below the threshold while the printing agent applicator 18 is disengaged; subsequently, when the magnitude of the difference is below the threshold, causing one or both secondary steering rollers 13B,13C to pivot about the respective secondary steering axes 15B,15C to adjust the position and/or skew of the blanket and engaging the printing agent applicator 18 while the primary roller axis 14A of the primary steering roller 13A remains static.

In some examples, the method of operating the offset print apparatus includes: determining the difference between the lateral position and/or skew of the blanket and the predetermined baseline position and/or skew; when the magnitude of the difference exceeds a first threshold, causing the primary steering roller 13A to pivot about the primary steering axis 15A to adjust the position and/or skew of the blanket to bring the magnitude below the first threshold while the printing agent applicator 18 is disengaged; subsequently, when the magnitude of the difference is below the first threshold but above a second threshold, the second threshold being lower than the first threshold, causing one or both secondary steering rollers 13B,13C to pivot about the respective secondary steering axes 15B,15C to adjust the position and/or skew of the blanket to bring the magnitude below the second threshold while the primary roller axis 14A of the primary steering roller 13A remains static and the printing agent applicator 18 is disengaged; and subsequently, when the magnitude of the difference is below the second threshold, engaging the printing agent applicator 18.

It will be understood that various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. Offset print apparatus comprising a blanket arranged in a closed loop around a plurality of rollers, each of the plurality of rollers being rotatable about a respective roller axis to support and convey the blanket around the closed loop, wherein the plurality of rollers comprises:

a primary steering roller rotatable about a primary roller axis and being pivotable about a primary steering axis perpendicular to the primary roller axis; and a secondary steering roller rotatable about a secondary roller axis and being pivotable about a secondary steering axis perpendicular to the secondary roller axis;

wherein the primary and secondary steering rollers are each independently pivotable and the offset print apparatus further comprises an actuator to actuate pivoting of the primary steering roller and the secondary steering roller;

wherein the primary steering roller is configured to steer the blanket by twisting and the secondary steering roller is configured to steer the blanket by stretching.

2. Offset print apparatus according to claim 1, comprising a controller to independently actuate the primary steering roller and the secondary steering roller to pivot about their respective steering axes to steer the blanket.

3. Offset print apparatus according to claim 2, wherein the controller is to select one of the primary steering roller and the secondary steering roller to actuate for a steering operation based on a magnitude of a difference between a lateral position and/or skew of the blanket and a predetermined baseline position and/or skew corresponding to the steering operation;

wherein the controller is to select the primary steering roller for a steering operation when the magnitude of the difference exceeds a threshold; and wherein the controller is to select the secondary steering roller for a steering operation when the magnitude of the difference is below the threshold.

4. Offset print apparatus according to claim 3, wherein the controller is to control a printing agent applicator so that the printing agent applicator is disengaged for steering operations when the magnitude of the difference exceeds a threshold, and is engaged for steering operations when the magnitude of the difference is below the threshold.

5. Offset print apparatus according to claim 1, wherein a wrap angle of the blanket around the primary steering roller is greater than a wrap angle of the blanket around the secondary steering roller.

6. Offset print apparatus according to claim 5, wherein the wrap angle of the blanket around the primary steering roller is greater than about 45° and the wrap angle of the blanket around the secondary steering roller is less than about 45°.

7. Offset print apparatus according to claim 1, wherein a diameter of the primary steering roller is greater than a diameter of the secondary steering roller.

8. Offset print apparatus according to claim 1, wherein the primary steering axis is inclined by no more than 45° relative to a plane tangent to a portion of the primary steering roller wrapped by the blanket such that pivoting the primary steering roller introduces the twist to the blanket and the secondary steering axis is perpendicular or inclined by more than 45° relative to any plane tangent to a portion of the secondary steering roller wrapped by the blanket.

9. Offset print apparatus according to claim 1, wherein the primary steering axis and the secondary steering axis are substantially perpendicular to one another.

10. Offset print apparatus according to claim 1, wherein the primary steering roller is translatable along a tensioning direction normal to the primary roller axis to vary a tension in the blanket, and wherein the offset print apparatus comprises a tensioning actuator to drive translation of the primary steering roller in the tensioning direction.

11. Offset print apparatus according to claim 1, wherein the offset print apparatus comprises a plurality of secondary steering rollers, each secondary steering roller being rotatable about a respective secondary roller axis and being pivotable about a respective secondary steering axis perpendicular to the corresponding secondary roller axis.

12. Offset print apparatus according to claim 2 further comprising a sensor to determine a lateral position and/or skew of the blanket, and wherein the controller is to independently actuate the primary steering roller and the secondary steering roller to pivot about their respective steering axes based on an output from the sensor.

13. A method of operating offset print apparatus of claim 1 comprising:

determining a difference between a lateral position and/or skew of the blanket and a predetermined baseline position and/or skew;

when a magnitude of the difference exceeds a threshold, causing the primary steering roller to pivot about the primary steering axis to adjust the position and/or skew of the blanket to bring the magnitude below the threshold; and subsequently, when the magnitude of the difference is below the threshold, causing the secondary steering roller to pivot about the secondary steering axis to adjust the position and/or skew of the blanket while the primary roller axis of the primary steering roller remains static.

14. Offset print apparatus comprising a blanket arranged in a closed loop around a plurality of rollers, each of the plurality of rollers being rotatable about a respective roller axis to support and convey the blanket around the closed loop, wherein the plurality of rollers comprises:

a primary steering roller rotatable about a primary roller axis and being pivotable about a primary steering axis perpendicular to the primary roller axis, the primary steering axis being inclined by no more than 45° relative to a plane tangent to a portion of the primary steering roller wrapped by the blanket such that pivoting the primary steering roller is configured to introduce twist to the blanket; and a secondary steering roller rotatable about a secondary roller axis and being pivotable about a secondary steering axis perpendicular to the secondary roller axis, the secondary steering axis being perpendicular or inclined by more than 45° relative to any plane tangent to a portion of the secondary steering roller wrapped by the blanket such that the secondary steering roller is configured to introduce stretch to the blanket;

wherein the primary and secondary steering rollers are each independently pivotable and the offset print apparatus further comprises an actuator to actuate pivoting of the primary steering roller and the secondary steering roller.

* * * * *